Nov. 3, 1931.  G. A. KLEIN  1,830,029
COMBINATION ADVERTISING AND MEMENTO DEVICE
Filed May 14, 1929
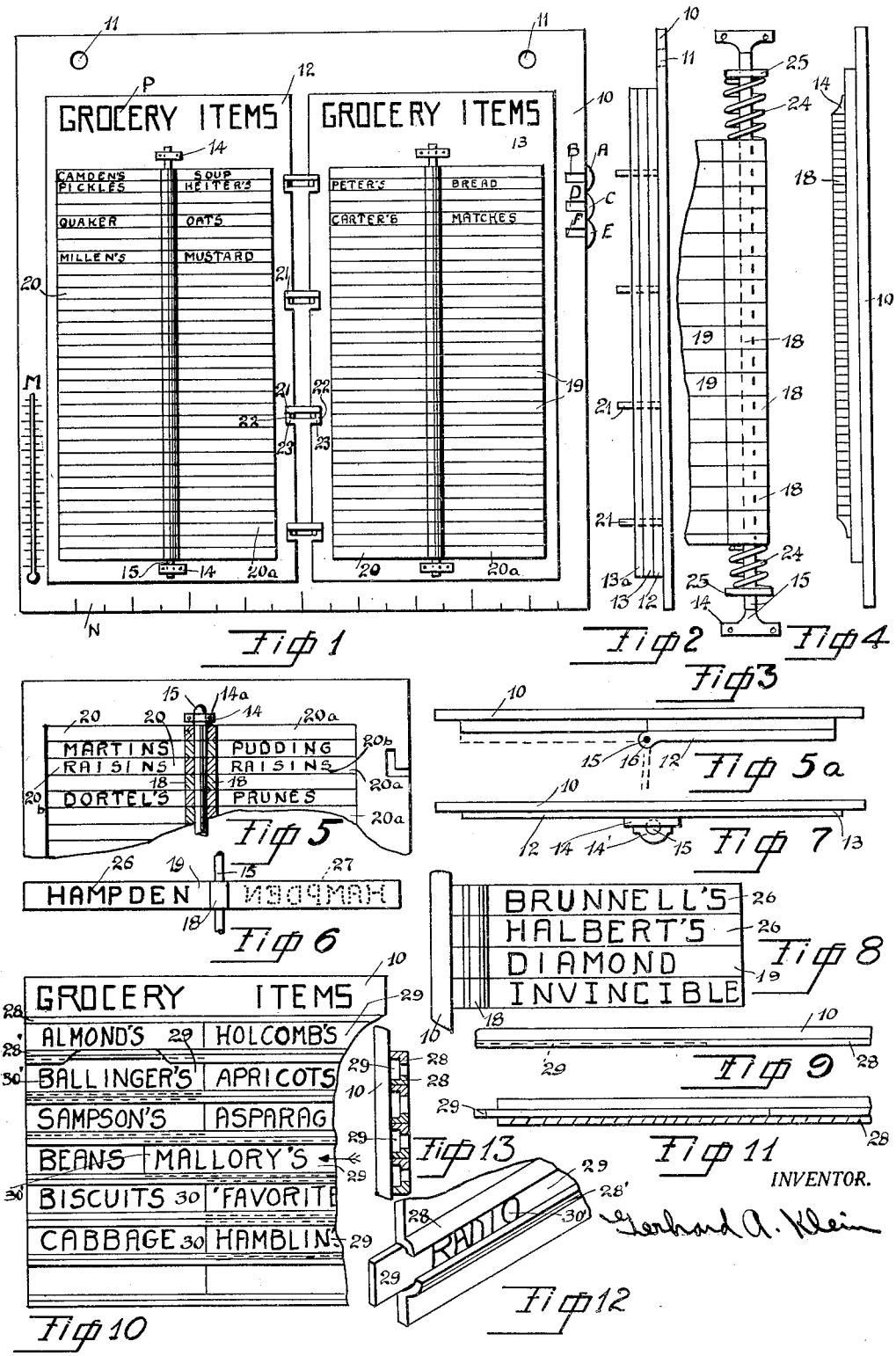
INVENTOR.
Gerhard A. Klein Patented Nov. 3, 1931

1,830,029

UNITED STATES PATENT OFFICE

GERHARD A. KLEIN, OF LOS ANGELES, CALIFORNIA

COMBINATION ADVERTISING AND MEMENTO DEVICE

Application filed May 14, 1929. Serial No. 362,997.

This invention relates to improvements in advertising devices and appliances and more particularly to advertising display means for linking the definite article of merchandise produced or distributed by a definite maker or advertiser with the name or brand of that maker or advertiser under conditions that serve to recall to mind on the part of a prospective purchaser the maker thereof, at the time he is about ready to order the same.

Another object of this invention is to provide a panel board inscribed with a classified system of names of articles of food or other merchandise and designed for the purpose of enabling a householder or the like to manually signal on the panel board any item or items of merchandise which he may soon be short of, for replenishing or repurchasing purposes, at the same time causing the householder, in the act of selectively positioning the signals upon the panel board to see before him conspicuously the ad of the advertiser selling the item in question.

A further object of this invention is to provide an advertising display device wherein two groups of classified names and designations of articles of merchandise are employed, in parallel columns for the purpose of repeating the same item in both columns in horizontal alinement, and wherein use is made of a name plate containing thereon the name of an advertiser or brand of goods which name plate in one position overlies so as to cover one item of each set, and exposes the other to indicate which items, uncovered as they are, are in stock. Means is provided for shifting the same name plate so as to make it expose the first item previously covered to denote that it is necessary to reorder this item, and to cover the first item of the same name, to thereby substitute in place of the item the name of its advertising maker and seller.

A still further object of this invention is to make it possible to group together a series of advertiser legends on one and the same display board, and associate each advertiser legend with the particular item of merchandise put out by this advertiser, the said advertiser legend appearing on a sign plate designed to be manually moved or shifted by the person interested in being reminded when to order the item advertised, in question, this shifting occurring from a position where the advertising legend merely acts blindly to indicate the existence of a supply of the item, in which case the advertising value of the advertising legends or indicia concerning this particular item is of secondary value as a business stimulator for the advertiser. But when the same name plate is shifted to another position it is designed to expose the name of the item and at the same time indicate that there is a shortage of the particular item or none left whatsoever, so at this time the onlooker or observer of the advertising legend is reminded that he should reorder the particular item and then instantly notices the name of the brand or of the advertiser putting out the desired goods; hence the value of the advertising indicia is fundamentally overmastering and compelling in its appeal to the reader to buy the article in question.

With the above and other objects in view my invention consists in the combination, arrangement and details of construction disclosed in the drawings and specification, and then more particularly pointed out in the appended claims.

In the drawings, wherein similar reference characters designate similar parts throughout the several views, Figure 1 is a front elevation of one form of my invention,

Figure 2 is an end elevation thereof,

Figure 3 is a fragmental detail view of the sign plates arranged in group formation, Figure 4 is another end elevation of the pages of the advertising device showing the hinges for the sign plates, Figure 5 is a fragmental detail front elevation of a page or panel board, detached from its backing,

Figure 5a is a fragmental top plan view of my invention,

Figure 6 is a detail view showing one sign plate in two different positions on its hinge mounting.

Figure 7 is another top plan view of the invention,

Figure 8 is a front elevation of certain name plates showing their hinged mounting upon the backing board, Figure 9 is a top plan view of another form of ticket guide forming part of my invention, Figure 10 is a fragmental front elevation of another type of my invention, Figure 11 is a fragmental sectional longitudinal section taken thru a ticket slidable guide, Figure 12 is a fragmental sectional view of a base board showing the ticket receiving guard, and Figure 13 is an end view, partly in section, showing the ticket receiving guides, grouped together vertically.

Referring to the drawings, wherein the parts are shown only by way of illustration a base board preferably made of rigid material or metal is formed with fastener receiving holes 11 at the upper end thereof for securing purposes. A set of preferably metal pages or leaves is composed of leaves 12 arranged on the left of medial line of the board 10, and leaves 13 arranged on the right side thereof. In another and copending application filed May 14, 1929, Serial No. 362,999, is described a type of means for hingedly mounting the metal leaves onto the base board 10. Thus along the medial line of the plate 10 extends a longitudinal series of right-angularly disposed and forwardly projecting loops or staples 21. The leaves each have a marginal edge formed with a longitudinally spaced apart series of bayonet-shaped slots 22, 23, 22 designating the vertical channel and 23 the horizontal channel of these slots respectively and it will be seen that the hinge leaf need simply be hooked on or off from the staple, the latter accommodating several thicknesses of leaves. The leaves being suspended upon the staple in hinged relation they are now ready to act as message conveyers or billboards, or memento devices for use in the household.

Two vertical groups of classified names designating various items of merchandise will be inscribed or printed in horizontal columns devoted to this purpose on each leaf 12, or 13 or the like, which horizontal columns flank the medial line of the leaf and it will be noticed that the same article names or designations will be repeated in both columns in horizontal alinement so that each item of mechandise appears printed twice, one alongside the other, as at 20, 20a, the item being designated at 20b.

A name or sign plate, preferably made of metal and designated 19 is employed to be shiftably mounted movably so that it can be quickly transferred from position overlying one item in one column or the other similarly designated item in the next adjacent column. Various means may be employed for the purpose of effecting this manual transfer. In Figure 1 each name plate occurs once for each set of name items similarly worded, and carries at one end a hinge collar 18, and all these collars overlie in surmounted relation and embrace a common hinge post or rod 15 operatively secured at opposite ends at 14 to the plate leaf or metal page. If desired, stout springs 24 may be coiled around the opposing ends of the post 15, bearing at one end against pins 25 secured to the post and exerting spring tension against the collars 18, all at the same time. Printed on opposite sides of each sign plate 19 will or may be the name of an advertiser, as at 26, 27, which represent the different sides of the sign plate, or the brand of trademark of the goods under which appellation they are called for over the counter may thus be printed where shown.

In operation it will be predeterminatedly agreed that normally, when the householder puts in a stock of food articles mentioned on the panel board, that all sign plates 19 will occupy a position at the right of the medial line of the board. Each sign plate will cover and conceal or shield the particular article of food with which it is associated, whilst uncovering and displaying or exposing the similarly worded article of food on the left column of classified items. This will signify no shortage or absence of any item, as long as the sign plate 19 affected is in the right hand position. As soon as it occupies this position while it displays the name of the advertiser, its use as advertising indicia is secondary. But just as soon as the householder wishes to be reminded that there is a shortage of any food item or the like classified on the chart or panel board, she swings the name plate opposite the particular item concerned to the left, where it comes to rest and now covers up the item previously exposed, and uncovers the same item previously covered, so now there is a logical sequence and cause and effect impression created in the mind of the householder, as now the opposite side of the same name plate displays the name of the brand or advertiser and makes this precede rather than follow the item to be purchased. So now the householder in the act of moving the sign plate is made to look upon the name of the advertiser at the moment she is thinking of buying the item advertised. In the same way other name plates can be readily turned over to denote repurchasing thereof and so by looking on the left vertical column of the items classified the householder can instantly see and be reminded to purchase the same, seeing the advertiser's name in connection therewith.

Instead of hinging each sign plate for a swinging movement to transfer it from one column to another it may be practicable to slide the name plate. In Figure 10 each horizontal sign designating the item of food, has a top and bottom guide offset flange 28, 28' pressed out preferably integrally from the blank or panel board to provide a guide for a ticket 29 slidable therein. As there are two alining horizontal guides for the set of similarly worded item or article of food the ticket 29 can readily be shifted from one position over one item, to position over the next and repeated item, and will otherwise act in the same manner already disclosed to denote the stock-in hand of any item or its shortage, as the case may be. In Figure 1 the display board is rendered more advantageously serviceable by having a ruler N imprinted along the lower marginal edge thereof, while a thermometer or barometer M is also provided and wheels A, C, E projecting beyond the edge of the board may be turned to display thru sight openings, B, D, and F the month and day of the year. I do not mean to confine myself to the exact details disclosed herein but mean to cover all variations falling within the purview of the appended claims.

What I desire to claim and secure by Letters Patent is:—

1. An advertising and reference device consisting of a chart having two parallel vertical columns printed with reminder items, each item appearing twice in horizontal alinement, once in each vertical column, and a panel bearing on opposite sides the same name or trademark brand of an advertiser, and designed to interchangeably cover the particular item in either column where same appears so the advertiser's card appears opposite the particular item in logical sequence.

2. An advertising and household-needs reference device consisting of a chart having two parallel vertical columns, there being inscribed in one column seriatim the names of household items of food and the like, the same items being spelled and inscribed in the next column in line with the items of the first column so that the same items are repeated in alinement in both columns, and advertiser display means associated movably over the chart in connection with each item inscribed for pointing out the source of origin of any item.

In witness whereof he has hereunder set his hand this 29th day of April, 1929.

GERHARD A. KLEIN.